(12) United States Patent
Nishikawa

(10) Patent No.: US 10,164,916 B2
(45) Date of Patent: Dec. 25, 2018

(54) COMMUNICATION APPARATUS WITH MULTIPLE BUFFERS AND CONTROL THEREOF

(71) Applicant: ALAXALA Networks Corporation, Kawasaki-shi, Kanagawa (JP)

(72) Inventor: Kouichi Nishikawa, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 148 days.

(21) Appl. No.: 15/220,435

(22) Filed: Jul. 27, 2016

(65) Prior Publication Data
US 2017/0041253 A1 Feb. 9, 2017

(30) Foreign Application Priority Data
Aug. 5, 2015 (JP) .................................. 2015-154690

(51) Int. Cl.
*H04L 12/861* (2013.01)
(52) U.S. Cl.
CPC ...... *H04L 49/9031* (2013.01); *H04L 49/9047* (2013.01)
(58) Field of Classification Search
CPC ................. H04L 49/9031; H04L 49/9047
See application file for complete search history.

(56) References Cited

U.S. PATENT DOCUMENTS

| | | | | |
|---|---|---|---|---|
| 5,175,765 A | * | 12/1992 | Perlman | H04L 29/06 370/390 |
| 5,361,255 A | * | 11/1994 | Diaz | H04L 12/5601 370/374 |
| 6,347,337 B1 | * | 2/2002 | Shah | H04L 47/10 709/224 |
| 6,721,277 B1 | * | 4/2004 | Yu | G06F 1/12 370/251 |
| 7,581,048 B1 | * | 8/2009 | Budd | G06F 11/201 710/38 |
| 9,444,751 B1 | * | 9/2016 | Alresaini | H04L 47/30 |
| 2002/0138655 A1 | * | 9/2002 | Jenison | H04L 29/06 709/250 |
| 2003/0063603 A1 | * | 4/2003 | Wu | H04L 49/25 370/386 |
| 2004/0143593 A1 | * | 7/2004 | Le Maut | H04L 49/552 |

(Continued)

FOREIGN PATENT DOCUMENTS

JP 2011-142535 A 7/2011

*Primary Examiner* — Tejis Daya
(74) *Attorney, Agent, or Firm* — Mattingly & Malur, PC

(57) ABSTRACT

A packet communication apparatus is configured to relay packets transmitted and received between information processing apparatuses. The packet communication apparatus includes: a network interface connectable to a network; a CPU to be a destination of at least one of a plurality of packets to be received through the network interface; a first buffer configured to hold the packets destined to the CPU in order to output the packets to the CPU; a second buffer having a plurality of planes and configured to hold copies of the packets destined to the CPU held in the first buffer in one of the plurality of planes; and a reception history controller configured to store a copy of a packet to a specified plane of the second buffer or to save copies of packets held in the second buffer to another storage area based on usage of the first buffer.

6 Claims, 11 Drawing Sheets

(56) References Cited

U.S. PATENT DOCUMENTS

| | | | |
|---|---|---|---|
| 2007/0030803 A1* | 2/2007 | Gooch | H04L 47/2433 370/230 |
| 2008/0247409 A1* | 10/2008 | Choudhury | H04L 49/90 370/412 |
| 2008/0250194 A1* | 10/2008 | Chen | G06F 12/0246 711/103 |
| 2011/0170552 A1 | 7/2011 | Suzuki et al. | |
| 2011/0258282 A1* | 10/2011 | Cantu | G06F 13/28 709/212 |
| 2015/0370630 A1* | 12/2015 | Yang | G06F 11/1044 711/103 |
| 2017/0329668 A1* | 11/2017 | Yang | G06F 11/1048 |

* cited by examiner

*FIG. 3*

| RECEPTION BUFFER SIZE | RECEPTION HISTORY CHANGE FLAG | RECEPTION HISTORY CHANGE ACTIVATION THRESHOLD | RECEPTION HISTORY CHANGE DEACTIVATION THRESHOLD | RECEPTION HISTORY SAVING THRESHOLD |
|---|---|---|---|---|
| 2000 | ON | 60% | 40% | 85% |
| A101 | A102 | A103 | A104 | A105 |

A100

| RECEPTION HISTORY BUFFER SIZE | MAXIMUM NUMBER OF RECEPTION HISTORY BUFFER PLANES | RECEPTION HISTORY BUFFER NUMBER FIRST TO BE WRITTEN | RECEPTION HISTORY BUFFER NUMBER IN USE | CHANGE FLAG | SAVING FLAG |
|---|---|---|---|---|---|
| 2000 | 10 | 1 | 4 | ON | OFF |
| B101 | B102 | B103 | B104 | B105 | B106 |

COMMUNICATION APPARATUS WITH MULTIPLE BUFFERS AND CONTROL THEREOF

CLAIM OF PRIORITY

The present application claims priority from Japanese patent application JP2015-154690 filed on Aug. 5, 2015, the content of which is hereby incorporated by reference into this application.

BACKGROUND

This invention relates to a communication apparatus.

The volume of the traffic transported between servers or terminals is not generally constant and sometimes surges to cause instantaneous overloading traffic (burst traffic). Packet communication apparatuses that receive such burst traffic for the CPU retain packets in the reception buffer and gradually output the packets from the buffer to prevent packet loss. However, when the burst traffic exceeds the capacity of the communication apparatus, a congestion incident occurs to cause packet loss.

The recent advancement in the performance of servers, terminals, and communication apparatuses raises the possibility of generation of such overloading traffic beyond expectation or traffic caused by evil activities such as an attack. When the volume of the burst traffic is too large, a communication apparatus cannot retain the packets in the buffer, which could cause packet loss and further, increase congestion incidents that disturb the normal operation.

Under the circumstances where network users are increasing, service providers make a single network apparatus accommodate a larger number of users in order to fully utilize the limited resources in providing the service. This is increasing cases where locating the traffic responsible for congestion in a communication apparatus is found difficult.

Congestion in a network apparatus disturbs stable operation of the network. It is desirable to prevent occurrence of congestion and if congestion occurs, speedily locate the responsible traffic and take measures to stabilize the network.

JP 2011-142535 A discloses a packet relay apparatus configured to, when burst traffic causes a packet to overflow or to be ready to overflow from a queue, mirror only the packets to be accumulated in that queue.

SUMMARY

The technique disclosed in JP 2011-142535 A saves the information stored in the relevant buffer of the packet relay apparatus as of the moment when the trigger event has occurred; accordingly, analyzing the background to the incident is difficult.

When increase in traffic causes overload to a communication apparatus and a packet relay apparatus, information on the cause of the event is unavailable or if available, the available is only the information as of the moment of occurrence of the event and the background to the incident is unavailable; accordingly, later analysis becomes difficult in many cases.

To solve at least one of the foregoing problems, this invention includes the following aspects. An aspect of this invention is represented by a packet communication apparatus that is configured to mirror a CPU-destined or CPU-originated packet in storing the packet to a reception buffer or a transmission buffer in a packet relay unit. The packet communication apparatus copies the packet and holds the copy to a reception history buffer provided correspondingly to the reception buffer or a transmission history buffer provided correspondingly to the transmission buffer. The reception history buffer may have a plurality of planes each having the same size as the reception buffer.

The packet communication apparatus of an aspect of this invention writes the copy of the packet to a plane of the reception history buffer determined depending on the usage of the reception buffer. Furthermore, the packet communication apparatus saves the copies of the packets held in the reception history buffer to another storage area depending on the usage of the reception buffer.

The CPU-destined packets or CPU-originated packets transmitted in the packet relay apparatus includes packets for a basic protocol such as ARP or NDP to perform IP communication and packets for other network protocols to implement a topology/network, that is to say, packets required for stable operation of the network. Accordingly, when a congestion incident occurs, analyzing the history of CPU-originated packets or CPU-destined packets and addressing the determined cause are important for stable operation of the network.

The holding and saving copies of packets while keeping relaying packets enable analysis of at least either one of packet reception history or packet transmission history.

BRIEF DESCRIPTION OF THE DRAWINGS

FIG. 3 is a diagram for illustrating a CPU-destined frame reception management data table;

FIG. 4 is an example of a reception history control data table;

DETAILED DESCRIPTION OF THE EMBODIMENTS

Figure 1:
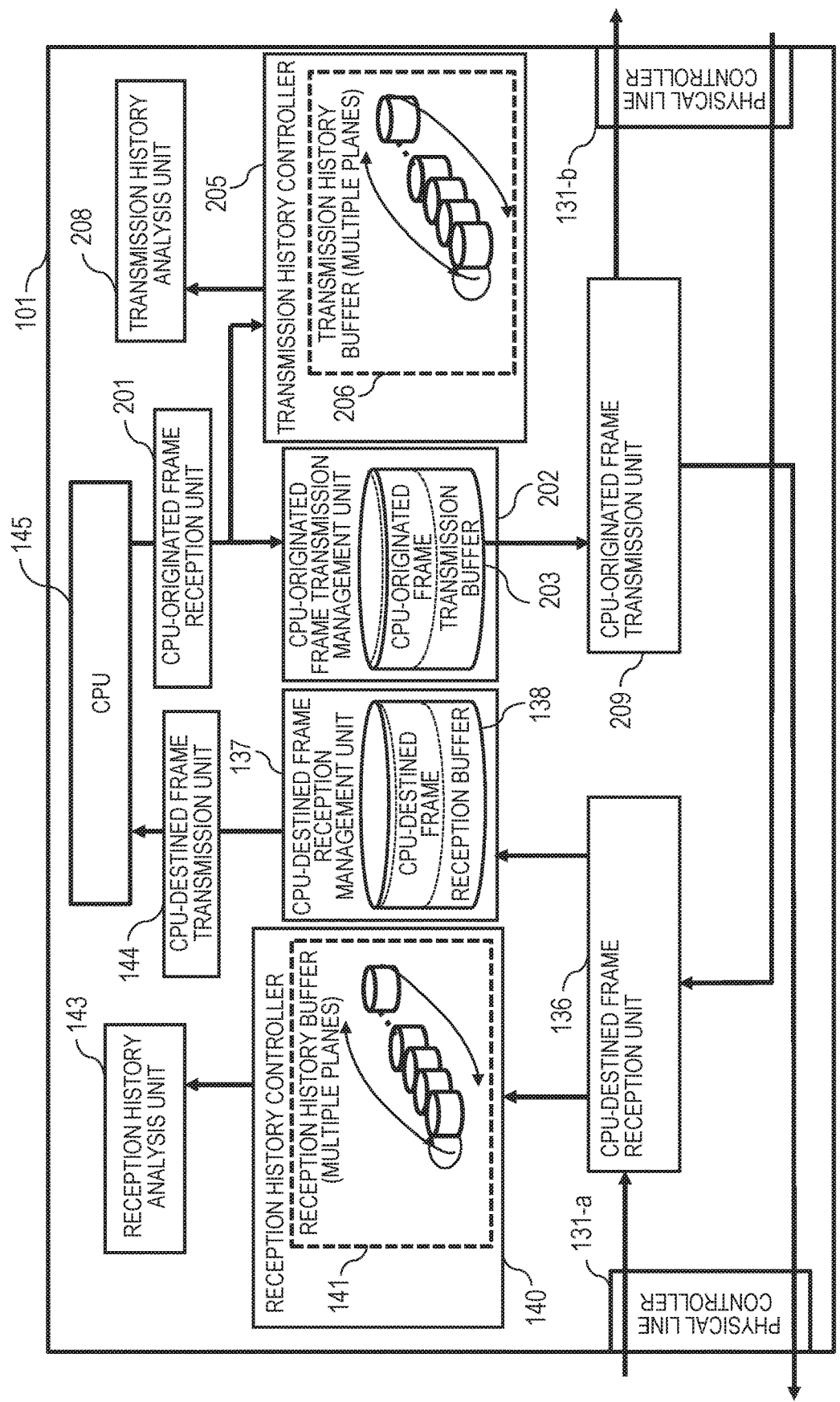
FIG. 1 is a diagram for illustrating a configuration of a packet communication apparatus.

FIG. 1 illustrates a configuration of a packet communication apparatus 101. With reference to FIG. 1, a sequence of controlling incoming CPU-destined packets and outgoing CPU-originated packets in the communication apparatus 101 is described. The packet communication apparatus 101 is a packet communication apparatus in a network such as the Internet and monitors/prevents congestion in the network apparatus and packet loss because of overloading traffic caused by an attack, for example, and analyzes the received packets.

The packet communication apparatus 101 includes physical line controllers 131-*a* and 131-*b*. The physical line controllers 131 are network interfaces connected to a network, and receive and send packets. The packet communication apparatus 101 further includes a CPU-destined frame reception management unit 137, a reception history controller 140, a reception history buffer 141, a reception history analysis unit 143, a CPU-originated frame transmission management unit 202, a transmission history controller 205, a transmission history buffer 206, and a transmission history analysis unit 208. A reception buffer 138 is a buffer for holding CPU-destined packets to output them to the CPU 145. The reception history buffer 141 has a plurality of planes each having the same size as the reception buffer 138 in the CPU-destined frame reception management unit 137 and holds copies of the packets held in the reception buffer 138 in one of the plurality of planes.

In the packet communication apparatus 101, the CPU-destined frame reception unit 136 duplicates each CPU-destined packet forwarded by the physical line controller 131-*a* or 131-*b* and stores the packet and the copy to the reception buffer 138 in the CPU-destined frame reception management unit 137 and the reception history buffer 141 in the reception history controller 140. The CPU-destined frame transmission unit 144 transfers the packets accumulated in the reception buffer 138 to the CPU 145 as needed. In contrast, the reception history controller 141 does not transfer the packets accumulated in the reception history buffer 141 and holds them as reception history information. The reception history controller 140 holds the copies of the CPU-destined packets in one of the planes of the reception history buffer 141 or saves the copies held in the reception history buffer to a storage area of the reception history analysis unit 143, depending on the usage of the reception buffer 138.

Specifically, if the monitoring result indicates that the reception buffer 138 keeps the status where the usage is lower than the threshold to change the buffer plane to store reception history information, the reception history controller 140 operates the first buffer plane of the reception history buffer 141 to be written as a ring buffer. As a result, the remaining reception history buffer other than the first buffer plane is not used; the reception history buffer can avoid being occupied by unnecessary information to achieve lower processing load in the apparatus. Meanwhile, the packet communication apparatus 101 can use the information held in the reception history buffer in packet analysis.

The CPU-destined frame reception management unit 137 monitors the usage of the reception buffer 138 and if the usage of the reception buffer 138 exceeds the threshold to change the buffer plane to store reception history information, or in response to an external event, the CPU-destined frame reception management unit 137 instructs the reception history controller 140 to change the buffer plane of the reception history buffer 141 to store the packets to the second buffer plane. Except for the first buffer plane, the buffer planes of the reception history buffer 141 to be written do not serve as ring buffer; when the packet storage area of the second buffer plane is used up, the reception history controller 140 changes the buffer plane to store reception history information to the third buffer plane. When the usage of the reception buffer 138 reaches a specific threshold to save the reception history information or in response to an external event, the reception history controller 140 saves all the reception history information held in the reception history buffer 141 to the reception history analysis unit 143. This operation enables analysis of the packets processed since the beginning of use of the reception buffer until occurrence of the event of saving the reception history information using the saved reception history information, so that not only the situation at the occurrence of in-apparatus congestion but also the background to the congestion can be analyzed.

The CPU-originated frame reception unit 201 duplicates each packet from the CPU 145 and stores the packet from the CPU 145 to the transmission buffer 203 in the CPU-originated frame transmission management unit 202 and the copy to the transmission history buffer 206 in the transmission history controller 205. The transmission buffer 203 holds outgoing packets output from the CPU 145 to send them to the network.

The CPU-originated frame transmission unit 209 forwards the packets accumulated in the transmission buffer 203 to the physical line controller 131-*b* or 131-*a* as needed. The transmission history controller 205 holds the packets accumulated in the transmission history buffer 206 as transmission history information, like the above-described reception history buffer 141. The transmission history buffer 206 has a plurality of buffer planes each having the same size as the transmission buffer 203 and holds copies of the outgoing packets held in the transmission buffer 203.

The CPU-originated frame transmission management unit 202 monitors the usage of the transmission buffer 203 and if the transmission buffer 203 keeps the status where the usage is lower than the threshold to change the buffer plane to store transmission history information, the transmission history controller 205 operates the first buffer plane of the transmission history buffer 206 to be written as a ring buffer. That is to say, the transmission history controller 205 holds the copies of the CPU-originated packets in the specified buffer plane of the transmission history buffer 206 or saves the copies of the CPU-originated packets held in the transmission history buffer 206 to the transmission history analysis unit 208 having another storage area.

Subsequently, when the usage of the transmission buffer 203 exceeds the threshold to change the buffer plane to store transmission history information, or in response to an external event, the transmission history controller 205 changes the buffer plane of the transmission history buffer 206 to store packets into the second buffer plane. Furthermore, when the usage of the transmission buffer 203 reaches a specific threshold to save the transmission history information or in response to an external event, the transmission history controller 205 saves all the transmission history information held in the transmission history buffer 206 to the transmission history analysis unit 208. The saved transmission history information may be used for the analysis of the packets processed since the beginning of use of the transmission buffer until occurrence of the event of saving the transmission history information.

The reception history controller 140 saves the reception history information stored in the reception history buffer 141 to the area to be used in analysis, namely, the reception history analysis unit 143, when the buffer usage exceeds the specific threshold or an external event occurs. The transmission history controller 205 saves the transmission history information stored in the transmission history buffer 206 to the area to be used in analysis, namely, the transmission history analysis unit 208, when the buffer usage exceeds the specific threshold or an external event occurs.

As to the packets received by the physical line controller 131-*b* and forwarded to the physical line controller 131-*a* via the CPU 145, the packets received by the physical line controller 131-*b* are duplicated and stored to the reception buffer 138 in the CPU-destined frame reception management unit 137 and the reception history buffer 141 in the reception history controller 140 provided correspondingly to the reception buffer.

Subsequently, the packets sent from the CPU 145 to the physical line controller 131-*a* are duplicated and stored to the transmission buffer 203 in the CPU-originated frame transmission management unit 202 and the transmission history buffer 206 in the transmission history controller 205 provided correspondingly to the transmission buffer. Since the transmission history buffer 206 receives the same control as the reception history buffer 141, analysis of both of the CPU-destined packets and the CPU-originated packets is available.

Hereinafter, function blocks, data tables, control of the reception history buffer or the transmission history buffer for CPU-destined/originated packets, and saving reception history information or transmission history information will be described in detail by way of embodiments.

Figure 2:
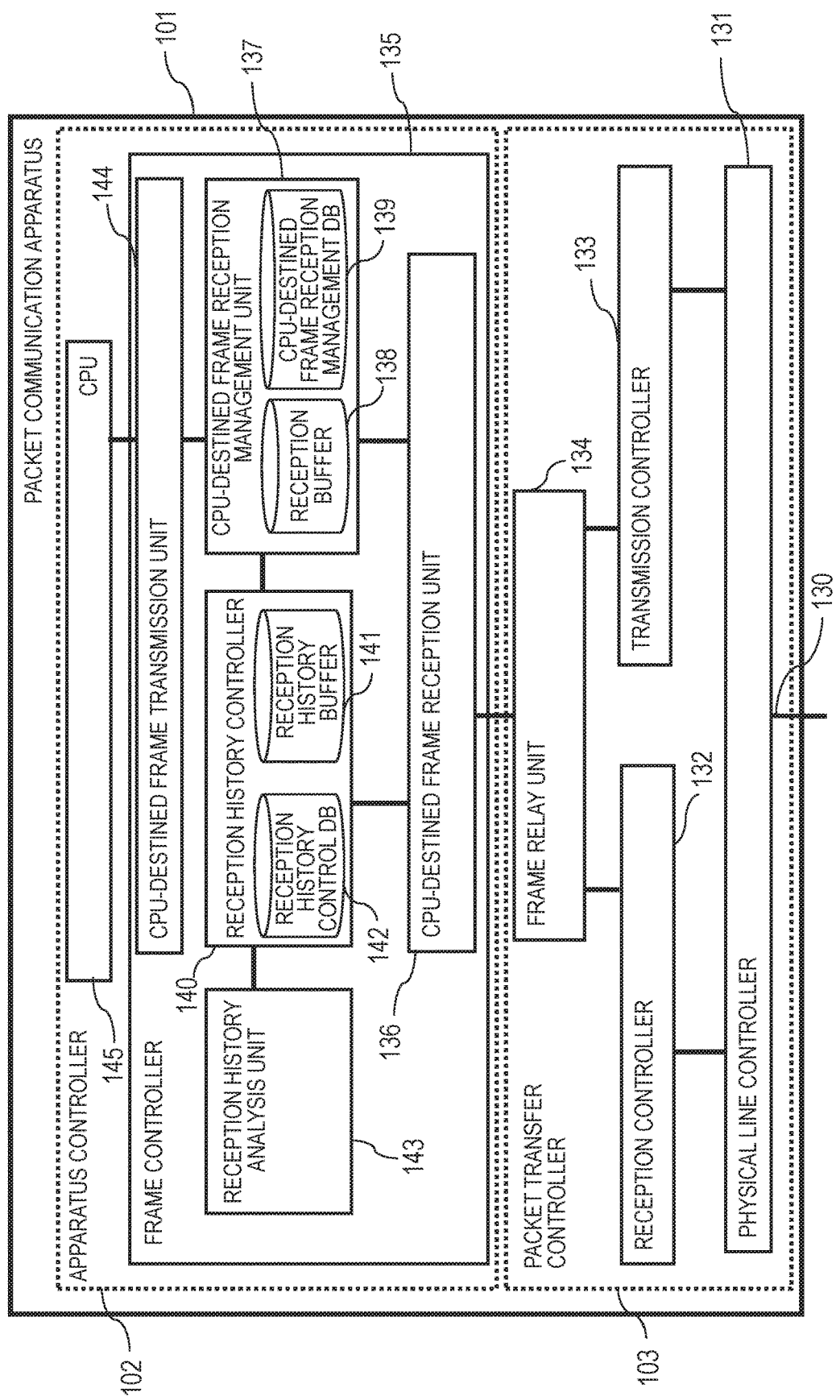
FIG. 2 is a diagram for illustrating a configuration to be involved in reception of CPU-destined packets in the packet communication apparatus.

FIG. 2 illustrates the apparatus configuration illustrated in FIG. 1 in more detail. FIG. 2 is a diagram for illustrating an example of a configuration to be involved in reception of CPU-destined packets in the packet communication apparatus 101. The packet communication apparatus 101 includes an apparatus controller 102 and a packet transfer controller 103. The apparatus controller 102 includes a frame controller 135 and a CPU 145.

The packet transfer controller 103 includes a physical line controller 131, a reception controller 132, a transmission controller 133, and a frame relay unit 134. The physical line controller 131 manages the conditions of the physical lines of the apparatus and has functions to send the packets received from the physical line 130 to the reception controller 132 and send the packets received from the transmission controller 133 to the physical line 130. The reception controller 132 has a function to send the packets received from the physical line controller 131 to the frame relay unit 134. The transmission controller 133 has a function to send the packets received from the frame relay unit 134 to the physical line controller 131.

The frame relay unit 134 has functions to identify a packet received from the reception controller 132 as a CPU-destined packet or a hard transfer packet, send a CPU-destined packet to the CPU-destined frame reception unit 136 of the frame controller 135, and send a hard transfer packet to the transmission controller 133 to transfer the packet to the network.

The frame controller 135 includes a CPU-destined frame reception unit 136, a CPU-destined frame reception management unit 137, a reception history controller 140, a reception history analysis unit 143, and a CPU-destined frame transmission unit 144. The frame controller 135 can be implemented with either hardware such as an FPGA or a program executed by the CPU. The CPU-destined frame reception unit 136 has functions to copy a packet received from the frame relay unit 134 and send the packet and the copy to the reception buffer 138 in the CPU-destined frame reception management unit 137 and the reception history buffer 141 in the reception history controller 140.

The CPU-destined frame reception management unit 137 includes a reception buffer 138 and a CPU-destined frame reception management database 139. The CPU-destined frame reception management unit 137 has functions to monitor the reception buffer 138, update the CPU-destined frame reception management database 139 upon receipt of a packet from the CPU-destined frame reception unit 136, and send the packet to the CPU-destined frame transmission unit 144 with reference to the CPU-destined frame reception management database 139. The CPU-destined frame reception management database 139 holds information on the status of the reception buffer 138 being monitored.

The reception history controller 140 includes a reception history buffer 141 and a reception history control database 142. The reception history controller 140 has functions to write a packet to the reception history buffer 141 upon receipt of the packet from the CPU-destined frame reception unit 136, update the reception history control database 142, and monitor the usage of the reception history buffer 141 with reference to the reception history control database 142. The reception history buffer 141 is a memory space including a plurality of storage areas or buffer planes to be written. The reception history buffer 141 may be allowed to concurrently use as many buffer planes as the maximum number minus one. The reception history control database 142 holds information on the status of writing to the reception history buffer 141.

The reception history analysis unit 143 has functions to analyze the information saved from the reception history buffer 141 and determine the traffic conditions until the occurrence of the incident or the circumstance of the incident that has triggered the buffer saving. The CPU-destined frame transmission unit 144 has a function to send a packet received from the CPU-destined frame reception management unit 137 to the CPU 145.

Figure 7:
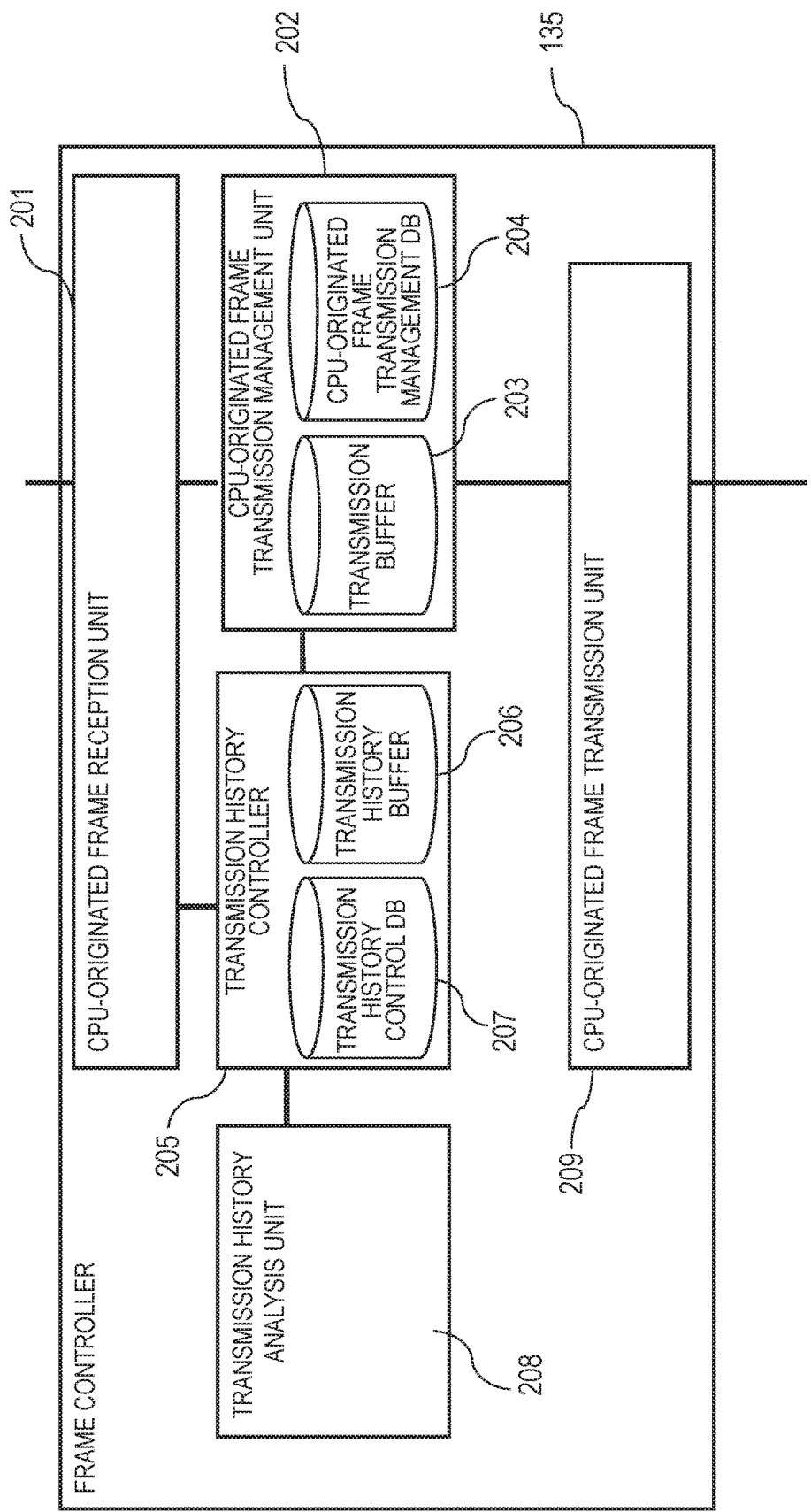
FIG. 7 is a diagram for illustrating a configuration to be involved in transmission of CPU-originated packets in the packet communication apparatus.

FIG. 7 illustrates a modified example of the frame controller 135 in the packet communication apparatus 101. The frame controller 135 in FIG. 7 is an internal configuration for sending CPU-originated packets.

The frame controller 135 includes a CPU-originated frame reception unit 201, a CPU-originated frame transmission management unit 202, a transmission history controller 205, a transmission history analysis unit 208, and a CPU-originated frame transmission unit 209. The CPU-originated frame reception unit 201 is a circuit having functions to copy a packet received from the CPU 145 and send the packet and the copy to a transmission buffer 203 in the CPU-originated frame transmission management unit 202 and a transmission history buffer 206 in the transmission history controller 205. The CPU-originated frame transmission management unit 202 includes the aforementioned transmission buffer 203 and a CPU-originated frame transmission management database 204. The CPU-originated frame transmission management unit 202 is a circuit having functions to monitor the transmission buffer 203, update the CPU-originated frame transmission management database 204 upon receipt of a packet from the CPU-originated frame reception unit 201, and send the packet to the CPU-originated frame transmission unit 209 with reference to the CPU-originated frame transmission management database 204.

The CPU-originated frame transmission management database 204 holds information on the status of the transmission buffer 203 being monitored. The transmission history controller 205 includes the aforementioned transmission history buffer 206 and a transmission history control database 207. The transmission history controller 205 has functions to write a packet to the transmission history buffer 206 upon receipt of the packet from the CPU-originated frame reception unit 201, update the transmission history control database 207, and monitor the usage of the transmission history buffer 206 with reference to the transmission history control database 207.

The transmission history buffer 206 has a plurality of buffer planes obtained by dividing the memory space. The transmission history buffer 206 may be allowed to concurrently use as many buffer planes as the maximum number minus one. The transmission history control database 207 holds information on the status of writing to the transmission history buffer 206.

The transmission history analysis unit 208 includes a non-volatile storage area and has functions to save information received from the transmission history buffer 206 and analyze the information to determine the traffic conditions until the occurrence of the incident or the circumstance of the incident that has triggered the buffer saving.

The CPU-originated frame transmission unit 209 has a function to send a packet received from the CPU-originated frame transmission management unit 202 to the frame relay unit 134. The frame controller 135 may be configured to relay both of the CPU-destined packets and the CPU-originated packets. In this case, the frame controller 135 includes a frame transmission and reception circuit connected with the CPU 145 and composed of the CPU-destined frame transmission unit 144 and the CPU-originated frame reception unit 201 and this interface may send and receive frames with the CPU 145. The frame controller 135 may control both of the reception buffer 138 and the transmission buffer 203. In this case, the frame controller 135 includes a transmission and reception management circuit for controlling transfer of the packets to be sent to the CPU 145 and the packets sent from the CPU 145 and the buffers for storing those packets on a temporary basis. The transmission and reception management circuit is composed of the CPU-destined frame reception management unit 137 and the CPU-originated frame transmission management unit 202. The frame controller 135 may further include the reception history controller 140 and the transmission history controller 205. In this case, the frame controller 135 includes a circuit for monitoring the usages of the reception history buffer 141 and the transmission history buffer 206, changing their buffer planes, and saving the data stored in the buffers to other resources for history analysis.

FIG. 3 illustrates the CPU-destined frame reception management database 139. The CPU-destined frame reception management database 139 held by the CPU-destined frame reception management unit 137 stores information about the status of the reception buffer 138 being monitored and includes, for example, the CPU-destined frame reception management data table A100 shown in FIG. 3. The CPU-destined frame reception management data table A100 includes fields of reception buffer size A101 for indicating the capacity, reception history change flag A102 for indicating whether changing the buffer planes of the reception history buffer is active, reception history change activation threshold A103 for indicating the threshold to activate changing the buffer planes of the reception history buffer, reception history change deactivation threshold A104 for indicating the threshold to deactivate changing the buffer planes of the reception history buffer, and reception history saving threshold A105 for indicating the threshold to save the information stored in the reception history buffer to the reception history analysis unit 143 to be analyzed, for the reception buffer to be monitored.

The reception history change flag A102 stores information for indicating whether changing the buffer planes of the reception history buffer is active. If the information is "on", the changing the buffer planes of the reception history buffer is active. If the information is "off", the reception history information is stored only in the plane specified as the reception history buffer first to be written. The reception history change activation threshold A103 is the threshold to activate the changing the buffer planes of the reception history buffer and is specified with the rate or the volume of the stored CPU-destined packets with respect to the capacity of the reception buffer. The reception history change deactivation threshold A104 is the threshold to return to the history management using the reception history buffer first to be written and is specified with the rate or the volume of the stored CPU-destined packets with respect to the capacity of the reception buffer. The reception history saving threshold A105 is the threshold to save the packets from the reception history buffer to the reception history analysis unit 143 and is specified with the rate or the volume of the stored CPU-destined packets with respect to the capacity of the reception buffer. For example, in the case where overflow of the reception buffer is used as a trigger to save the packets to the reception history analysis unit 143, the reception history saving threshold A105 is set to 100%.

The reception buffer size A101 in the CPU-destined frame reception management data table A100 is the size of the reception buffer 138 and a fixed value. The reception history change activation threshold A103, the reception history change deactivation threshold A104, and the reception history saving threshold A105 in the CPU-destined frame reception management data table A100 are generated in advance through configuration setting in accordance with external inputs.

FIG. 4 illustrates the reception history control database 142. The reception history control database 142 held by the reception history controller 140 holds information on the status of the reception history buffer 141 being written and may have a structure of the reception history control data table B100 shown in FIG. 4. The reception history control data table B100 includes fields of reception history buffer size B101 for indicating the maximum packets that can be stored in each buffer plane of the reception history buffer, maximum number of reception history buffer planes B102 for indicating the maximum number of buffer planes in the reception history buffer to store reception history information, reception history buffer number first to be written B103 for indicating the plane number of the reception history buffer that serves as a ring buffer for storing the reception history in normal times, reception history buffer number in use B104 for indicating the plane number of the reception history buffer that is currently storing reception history information, a change flag B105 for indicating whether the reception buffer 138 is in the status to activate the changing the buffer planes of the reception history buffer, which is preliminary processing of the saving the reception history information, and a saving flag B106 for indicating whether to save the reception history buffer.

The reception history buffer size B101 in the reception history control data table B100 is the size of each buffer plane of the reception history buffer 141 of the apparatus. Since the reception history buffer size B101 is the same as the size of the reception buffer 138, it takes a fixed value. The reception history buffer 141 includes a plurality of equally-sized buffer planes and the number of reception history buffer planes that can be used to save reception history information is the number obtained by subtracting one from the maximum number of reception history buffer planes B102. This is because at least one plane needs to serve as a ring buffer to store packet information received while the packet information stored in the reception history buffer is being saved to the reception history analysis unit 143. The maximum number of reception history buffer planes B102 in the reception history control data table B100 is generated in advance through configuration setting. The change flag B105 and the saving flag B106 in the reception history control data table B100 are generated based on the information received from the CPU-destined frame reception management unit 137.

Figure 5:
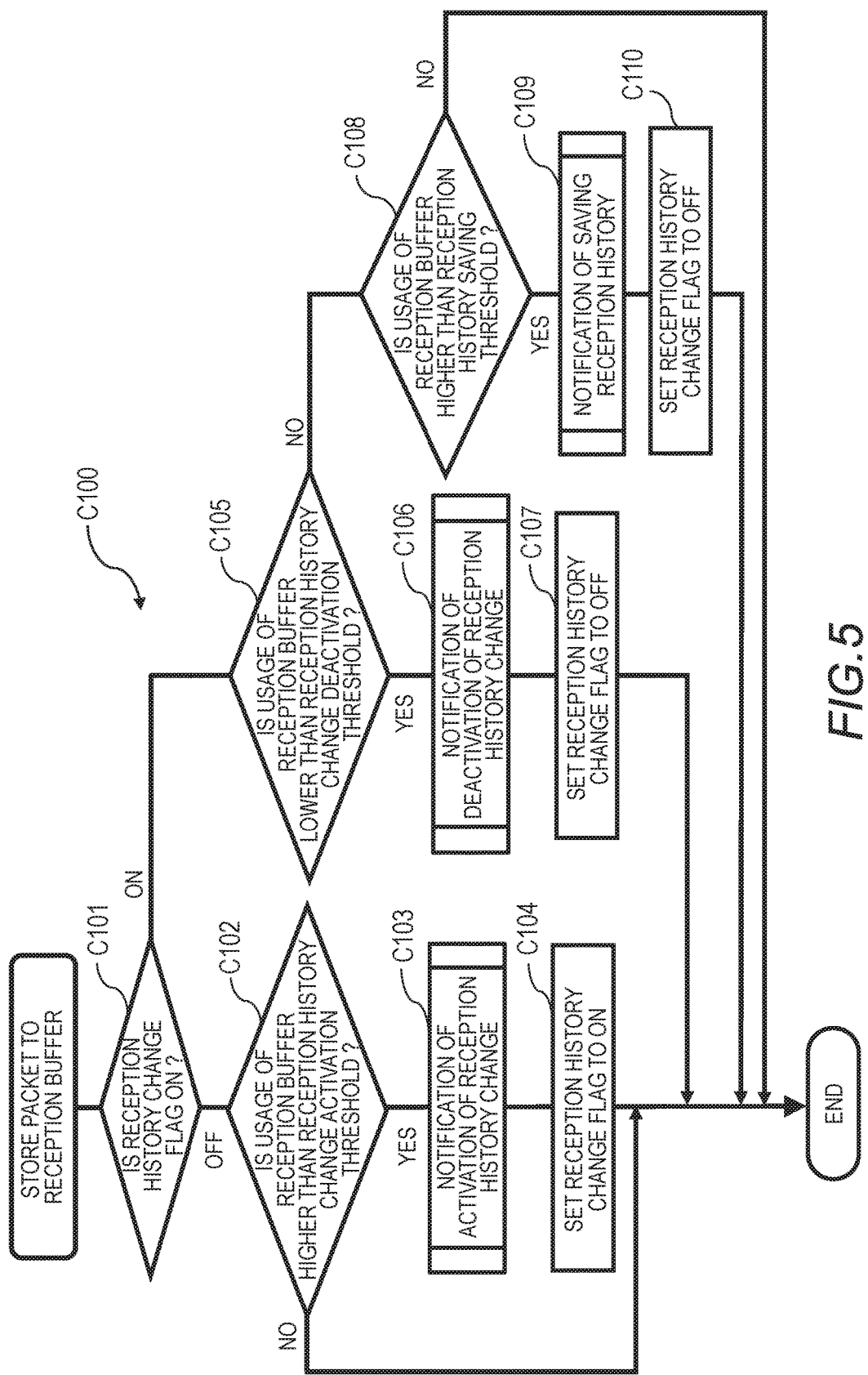
FIG. 5 is a flowchart for illustrating details of packet reception processing to be performed by a CPU-destined frame reception management unit 137.

FIG. 5 is a flowchart of packet reception processing C100 to be performed by the CPU-destined frame reception management unit 137 in the packet communication apparatus 101. This processing is performed when a packet is stored to the reception buffer 138 in the CPU-destined frame reception management unit 137, for example. Upon storing a packet to the reception buffer 138, the CPU-destined frame reception management unit 137 determines whether the reception history change flag A102 is on or off with reference to the CPU-destined frame reception management data table A100 at C101. The CPU-destined frame reception management unit 137 proceeds to C105 if the reception history change flag A102 is on and proceeds to C102 if the reception history change flag A102 is off. At C102, the CPU-destined frame reception management unit 137 determines whether the usage of the reception buffer 138 that has stored the packet is higher than the reception history change activation threshold A103 with reference to the CPU-destined frame reception management data table A100. The CPU-destined frame reception management unit 137 proceeds to C103 if the usage is higher than the threshold and terminates the processing if the usage is not higher than the threshold A103.

At C103, the CPU-destined frame reception management unit 137 notifies the reception history controller 140 to activate changing the reception history buffer planes, sets the change flag B105 in the reception history control data table B100 to on, and proceeds to C104. At C104, the CPU-destined frame reception management unit 137 sets the reception history change flag A102 to on and terminates the processing.

At C105, the CPU-destined frame reception management unit 137 determines whether the usage of the reception buffer 138 that has stored the packet is lower than the reception history change deactivation threshold A104. The CPU-destined frame reception management unit 137 proceeds to C106 if the usage is lower than the threshold A104 and proceeds to C108 if the usage is not lower than the threshold A104. At C106, the CPU-destined frame reception management unit 137 notifies the reception history controller 140 to deactivate the changing the reception history buffer planes, sets the saving flag B106 in the reception history control data table B100 to on, and proceeds to C107. At C107, the CPU-destined frame reception management unit 137 sets the reception history change flag A102 to off and terminates the processing.

At C108, the CPU-destined frame reception management unit 137 determines whether the usage of the reception buffer 138 that has stored the packet is higher than the reception history saving threshold A105 with reference to the CPU-destined frame reception management data table A100. The CPU-destined frame reception management unit 137 proceeds to C109 if the usage is higher than the threshold A105 and terminates the processing if the usage is not higher than the threshold A105. At C109, the CPU-destined frame reception management unit 137 notifies the reception history controller 140 to save the entire reception history buffer 141, sets the saving flag B106 in the reception history control data table B100 to on, and proceeds to C110. At C110, the CPU-destined frame reception management unit 137 sets the reception history change flag A102 to off and terminates the processing. It should be noted that the CPU-destined frame reception management unit 137 may monitor the usage of the reception buffer 138 and periodically, instead of in response to receipt of a packet, make determinations of C102, C105, and C108 in FIG. 5 about whether the usage of the reception buffer 138 exceeds the thresholds. The CPU-destined frame reception management unit 137 may acquire the usage of the reception buffer 138 with reference to the CPU-destined frame reception management data table A100 in accordance with the flowchart of FIG. 5 of an example.

Figure 6:
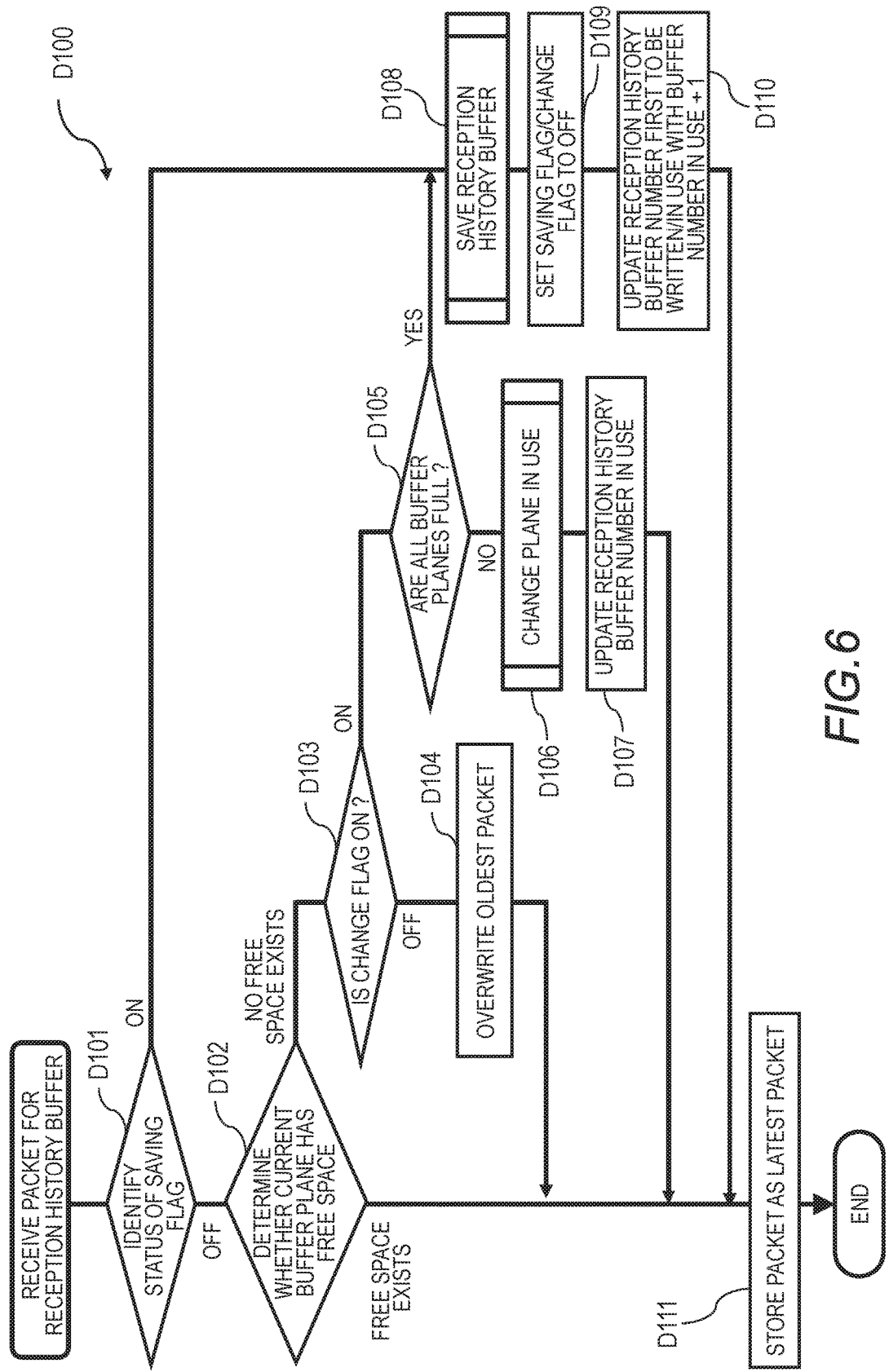
FIG. 6 is a flowchart for illustrating details of reception history buffering processing to be performed by a reception history controller 140.

FIG. 6 is a flowchart of reception history buffering processing D100 to be performed by the reception history controller 140 in the packet communication apparatus 101. This processing is described using an example performed in response to reception of a packet for the reception history buffer 141. At D101, the reception history controller 140 determines whether the saving flag B106 in the reception history control data table B100 is on or off. The reception history controller 140 proceeds to D108 if the flag B106 is on and proceeds to D102 if the flag B106 is off. At D102, the reception history controller 140 acquires the number in the reception history buffer number in use B104 from the reception history control data table B100 and determines whether the buffer plane of the acquired number has free space to store the received packet. The reception history controller 140 proceeds to D111 if the buffer plane has free space and proceeds to D103 if the buffer plane does not have enough free space. At D103, the reception history controller 140 determines the change flag B105 in the reception history control data table B100 is on or off. The reception history controller 140 proceeds to D105 if the flag B105 is on and proceeds to D104 if the flag B105 is off.

At D104, the reception history controller 140 overwrites the oldest packet in the reception history buffer 141 with the received packet to store the received packet to the reception history buffer 141 and proceeds to D111.

At D105, the reception history controller 140 determines whether each plane of the reception history buffer 141 holds data with reference to the reception history control data table B100. Specifically, the reception history controller 140 determines whether the reception history buffer 141 holds packets in as many buffer planes as the number obtained by subtracting one from the maximum number of reception history buffer planes B102 in the reception history control data table B100. The reception history controller 140 proceeds to D108 if the determination is Yes and proceeds to D106 if the determination is No. At D106, the reception history controller 140 changes the plane of the reception history buffer to store the received packet and proceeds to D107. In changing the plane of the reception history buffer to be used, the reception history controller 140 may add the time of the change of the plane to the beginning of the plane of the reception history buffer. As a result, analysis of the time factor becomes available in the analysis after saving the reception history buffer information. At D107, the reception history controller 140 updates the reception history buffer number in use B104 in the reception history control data table B100 and proceeds to D111.

At D108, the reception history controller 140 saves all the reception history information stored in the buffer planes starting from the reception history buffer number first to be written B103 to the reception history buffer number in use B104 in the reception history control data table B100 to the reception history analysis unit 143 for the purpose of analysis, clears the reception history buffer that have been saved, and proceeds to D109. At D109, the reception history controller 140 sets the change flag B105 and the saving flag B106 in the reception history control data table B100 to off and proceeds to D110. At D110, the reception history controller 140 updates the reception history buffer number first to be written B103 and the reception history buffer number in use B104 in the reception history control data table B100 with a value of the reception history buffer number in use B104 plus one and proceeds to D111. At D111, the reception history controller 140 stores the received packet to the reception history buffer 141 as the latest packet and terminates the processing.

The foregoing is the description of the tables owned by the packet communication apparatus 101 and the processing of the packet communication apparatus 101 to manage the history of reception of CPU-destined packets. The tables and the processing of the packet communication apparatus 101 to manage the history of transmission of CPU-originated packets are the same as FIGS. 3 to 6. For example, the CPU-originated frame transmission management database 204 and the transmission history control database 207 can be structured by replacing the "reception" in the items of FIGS. 3 and 4 with "transmission".

The CPU-originated frame transmission management unit 202 performs the same processing as the flowchart of FIG. 5 where "reception" has been replaced by "transmission". The transmission history controller 205 performs the same processing as the flowchart of FIG. 6 where "reception" has been replaced by "transmission".

FIGS. 8, 9, 10, and 11 are diagrams for schematically illustrating the operation of the CPU-destined frame reception unit 136, the CPU-destined frame reception management unit 137, and the reception history controller 140. The tables in the drawings are a CPU-destined frame reception management data table K139 and a reception history control data table K142 in the packet communication apparatus 101. Although the reception history buffer 141 in the reception history controller 140 has ten planes (which are also referred to as reception history buffers) of No. 1 to No. 10, the number of planes is not limited to this.

Figure 8:
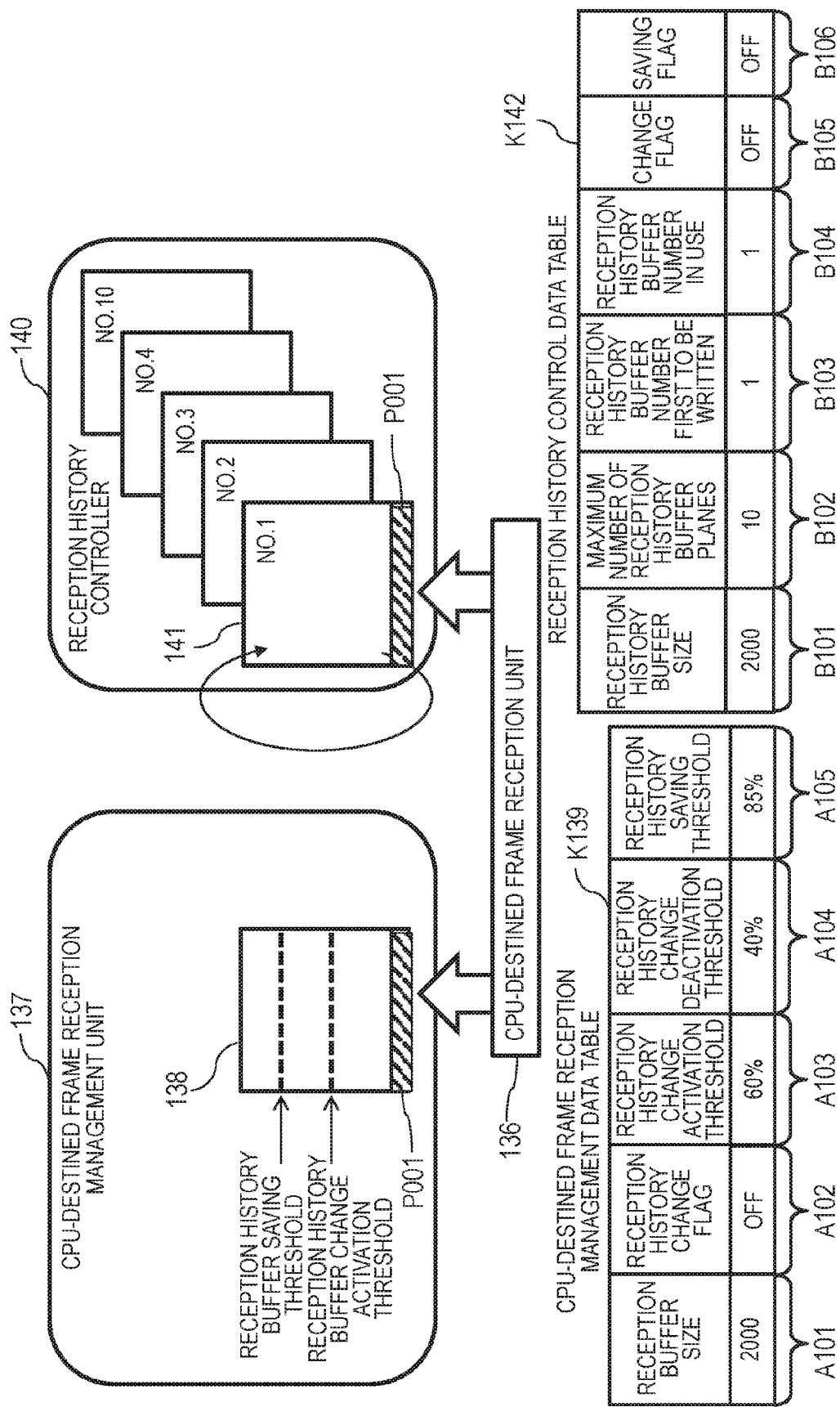
FIG. 8 is a diagram for illustrating packets stored in the reception buffer and packets stored in the reception history buffer in time series.

FIG. 8 illustrates the operation of the CPU-destined frame reception management unit 137 and the reception history controller 140 in the case where the usage of the reception buffer 138 in the CPU-destined frame reception management unit 137 is not higher than the reception history change activation threshold in the CPU-destined frame reception management data table K139. The described hereinafter is a case where the usage of the reception buffer 138 in the CPU-destined frame reception management unit 137 exceeds the reception history change activation threshold A103 in the CPU-destined frame reception management data table K139 and thereafter, exceeds the reception history saving threshold A105 as well. First, the CPU-destined frame reception unit 136 sends a CPU-destined packet P001 to the CPU-destined frame reception management unit 137 and the reception history controller 140.

After storing the CPU-destined packet P001 to the reception buffer 138, the CPU-destined frame reception management unit 137 determines whether the reception history change flag A102 is on or off with reference to the CPU-destined frame reception management data table K139 (C101). Since the reception history change flag A102 is off, the CPU-destined frame reception management unit 137 determines whether the usage of the reception buffer 138 including the received packet is higher than the reception history change activation threshold A103 (C102). Since the determination is that the usage of the reception buffer 138 is not higher than the reception history change activation threshold A103, the CPU-destined frame reception management unit 137 terminates the processing of FIG. 5.

Upon receipt of the CPU-destined packet P001, the reception history controller 140 determines whether the saving flag B106 is on or off with reference to the reception history control data table K142 (D101). Since the saving flag B106 is off, the reception history controller 140 determines whether the reception history buffer in use has free space with reference to the reception history control data table K142 (D102). Since the reception history buffer in use has free space and further, the reception history control data table K142 indicates that the reception history buffer number first to be written B103 is the same number as the reception history buffer number in use B104, the reception history controller 140 stores the packet P001 to the reception history buffer first to be written (D111). Although the packet P001 in the reception buffer 138 in the CPU-destined frame reception management unit 137 is transferred later to the CPU-destined frame transmission unit 144, the packet P001 in the reception history buffer 141 in the reception history controller 140 is retained because the reception history buffer 141 is to accumulate reception packet information. For example, the copy of the packet P001 held in the reception history buffer 141 is retained until being overwritten at D104 or saved to the storage area of the reception history analysis unit 143, even after the packet P001 is sent to the CPU 145. The same processing is applied to the next incoming CPU-destined packet P002 by the CPU-destined frame reception management unit 137 and the reception history controller 140, in accordance with the flowchart of FIG. 6.

Figure 9:
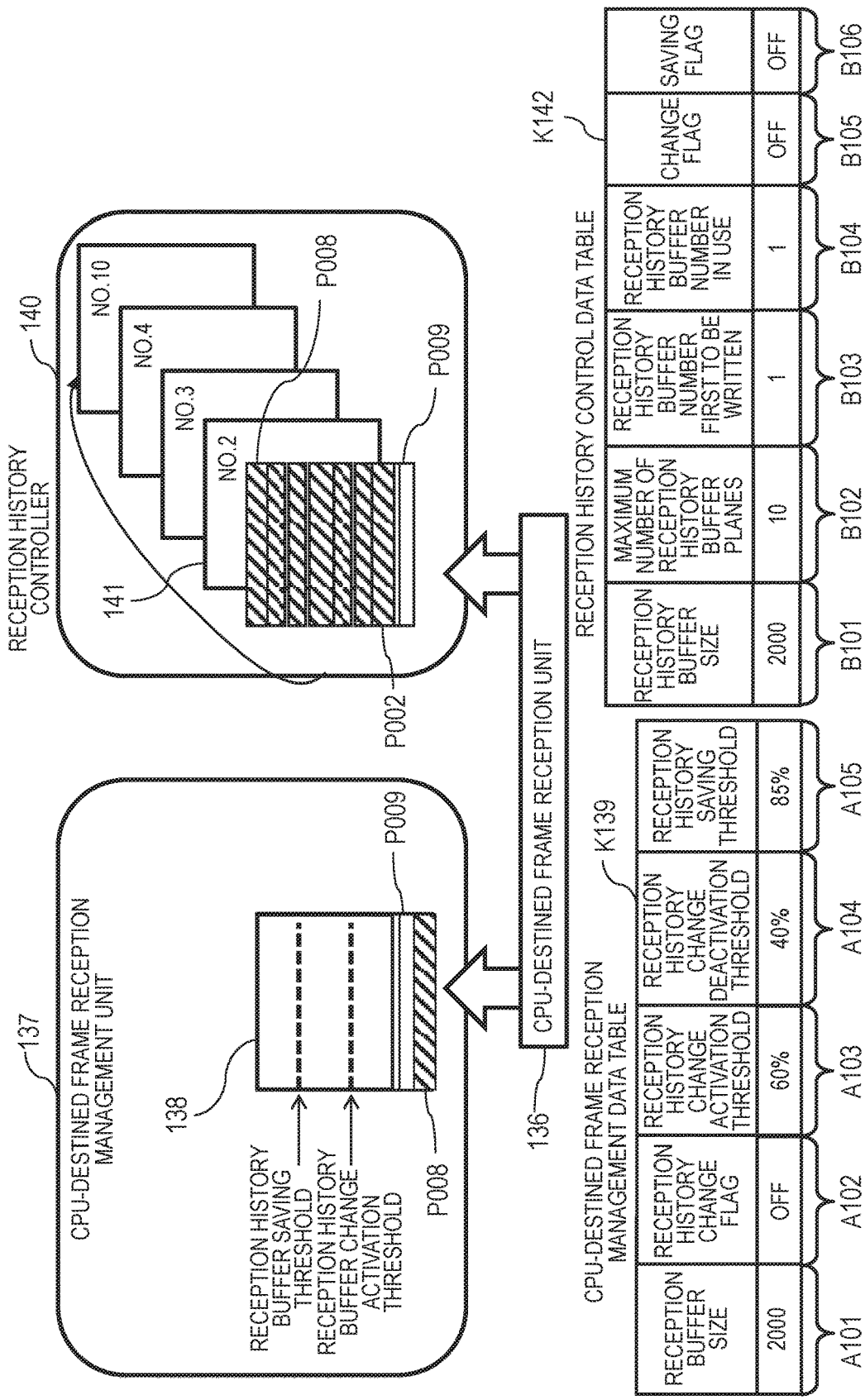
FIG. 9 is a diagram for illustrating packets stored in the reception buffer and packets stored in the reception history buffer in time series.

FIG. 9 illustrates the operation of the CPU-destined frame reception management unit 137 and the reception history controller 140 in the case where the reception history buffer number in use B104 includes the same number as the reception history buffer number first to be written B103 and the reception history buffer in use does not have enough free space. First, the CPU-destined frame reception unit 136 sends a CPU-destined packet P009 to the CPU-destined frame reception management unit 137 and the reception history controller 140. After storing the CPU-destined packet P009 to the reception buffer 138, the CPU-destined frame reception management unit 137 determines whether the reception history change flag A102 is on or off with reference to the CPU-destined frame reception management data table K139 (C101). Since the reception history change flag A102 is off, the CPU-destined frame reception management unit 137 determines whether the usage of the reception buffer 138 including the received packet is higher than the reception history change activation threshold A103 (C102). Since the usage of the reception buffer 138 is not higher than the reception history change activation threshold A103, the CPU-destined frame reception management unit 137 terminates the processing of FIG. 5.

Upon receipt of the CPU-destined packet P009 for the reception history buffer 141, the reception history controller 140 determines whether the saving flag B106 is on or off with reference to the reception history control data table K142 (D101). Since the saving flag B106 is off, the reception history controller 140 determines whether the reception history buffer in use has free space with reference to the reception history control data table K142 (D102). Since the reception history buffer in use does not have enough free space, the reception history controller 140 determines whether the change flag B105 is on or off with reference to the reception history control data table K142 (D103). Since the change flag B105 is off, the reception history controller 140 compares the reception history buffer number first to be written B103 with the reception history buffer number in use B104 in the reception history control data table K142. Since the reception history buffer number first to be written B103 includes the same number as the reception history buffer number in use B104, the reception history controller 140 overwrites the oldest packet P001 held in the first plane of the reception history buffer 141 based on the reception history buffer number first to be written B103 (D104). Hence, the reception history buffer plane first to be written is used as a ring buffer; the reception history controller 140 applies the same processing to the next incoming CPU-destined packet P010 and subsequent packets in accordance with the flowchart of FIG. 6.

Figure 10:
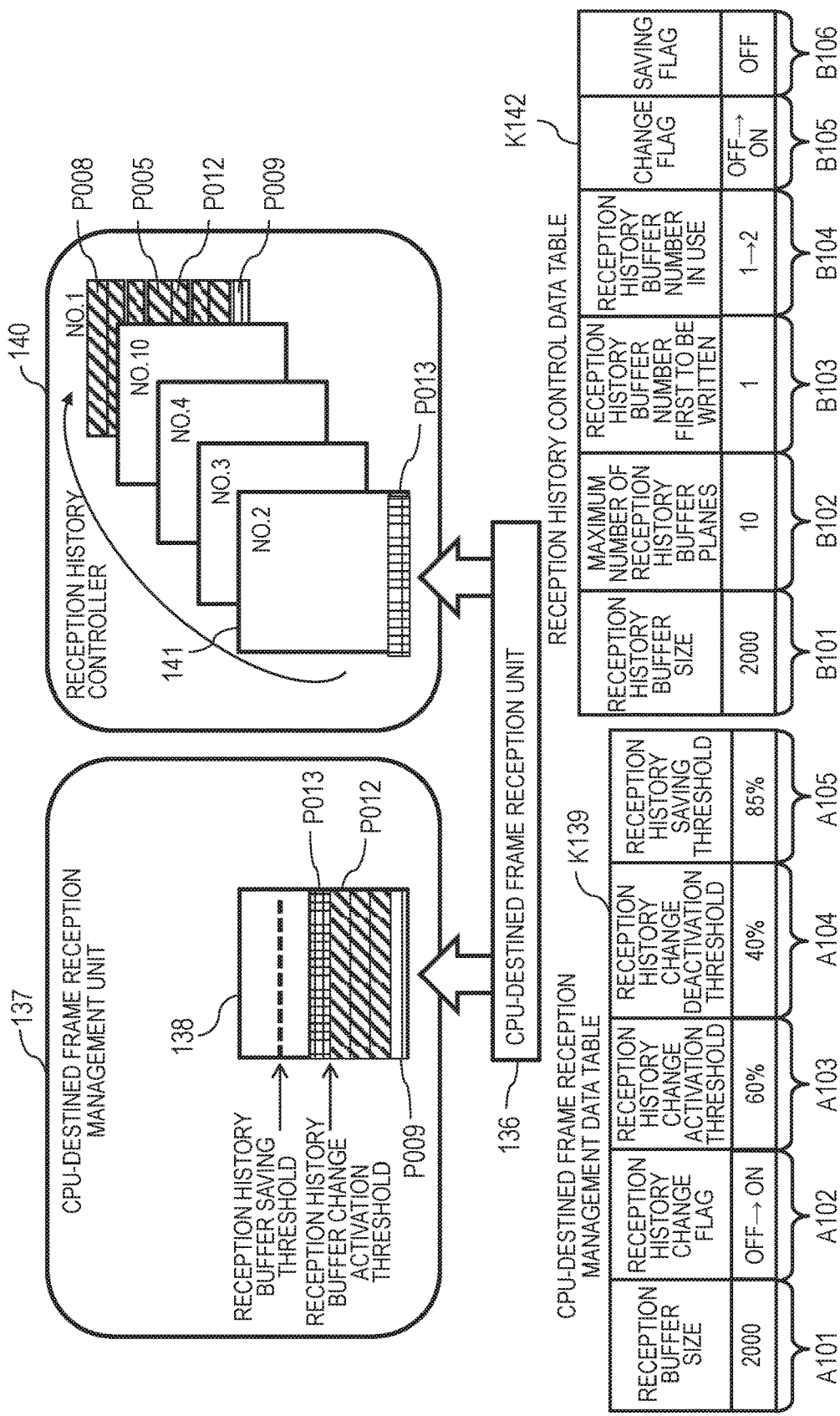
FIG. 10 is a diagram for illustrating packets stored in the reception buffer and packets stored in the reception history buffer in time series.

FIG. 10 illustrates the operation of the CPU-destined frame reception management unit 137 and the reception history controller 140 in the case where the usage of the reception buffer 138 in the CPU-destined frame reception management unit 137 exceeds the reception history change activation threshold A103 in the CPU-destined frame reception management data table K139 when the CPU-destined frame reception unit 136 sends a CPU-destined packet P013 to the CPU-destined frame reception management unit 137 and the reception history controller 140. After storing the CPU-destined packet P013 to the reception buffer 138, the CPU-destined frame reception management unit 137 determines whether the reception history change flag A102 is on or off with reference to the CPU-destined frame reception management data table K139 (C101). Since the reception history change flag A102 is off, the CPU-destined frame reception management unit 137 determines whether the usage of the reception buffer 138 including the received packet is higher than the reception history change activation threshold A103 (C102). Since the usage of the reception buffer 138 is higher than the reception history change activation threshold A103, the CPU-destined frame reception management unit 137 notifies the reception history controller 140 of activation of changing the plane of the reception history buffer (C103) and sets the reception history change flag A102 in the CPU-destined frame reception management data table K139 to on (C104). Upon receipt of the reception history change notification from the CPU-destined frame reception management unit 137, the reception history controller 140 sets the change flag B105 in the reception history control data table K142 to on.

Upon receipt of the CPU-destined packet P013 for the reception history buffer 141, the reception history controller 140 determines whether the saving flag B106 is on or off with reference to the reception history control data table K142 (D101). Since the saving flag B106 is off, the reception history controller 140 determines whether the reception history buffer in use has free space with reference to the reception history control data table K142 (D102). Since the reception history buffer in use does not have enough free space, the reception history controller 140 determines whether the change flag B105 is on or off with reference to the reception history control data table K142 (D103).

Since the change flag B105 is on, the reception history controller 140 determines whether the reception history buffer number in use B104 is the number allowed for a single operation of saving reception history information, which can be obtained by subtracting one from the maximum number of reception history buffer planes B102, with reference to the reception history control data table K142 (D105). Since the reception history buffer number in use B104 is "1", which is not the number of "the maximum number of reception history buffer planes B102 minus one", the reception history controller 140 increments the reception history buffer number in use B104 by one and stores the CPU-destined packet P013 to the new reception history buffer (the second reception history buffer) (D106, D107). Except for the first reception history buffer, each time the buffer stores packets up to the size of the reception history buffer size B101, the reception history controller 140 increments the reception history buffer number in use B104 by one so that the next plane will store packets (D106, D107). The reception history controller 104 repeats the operation of FIG. 6 up to the number of planes obtained by subtracting one from the maximum number of reception history buffer planes B102.

Figure 11:
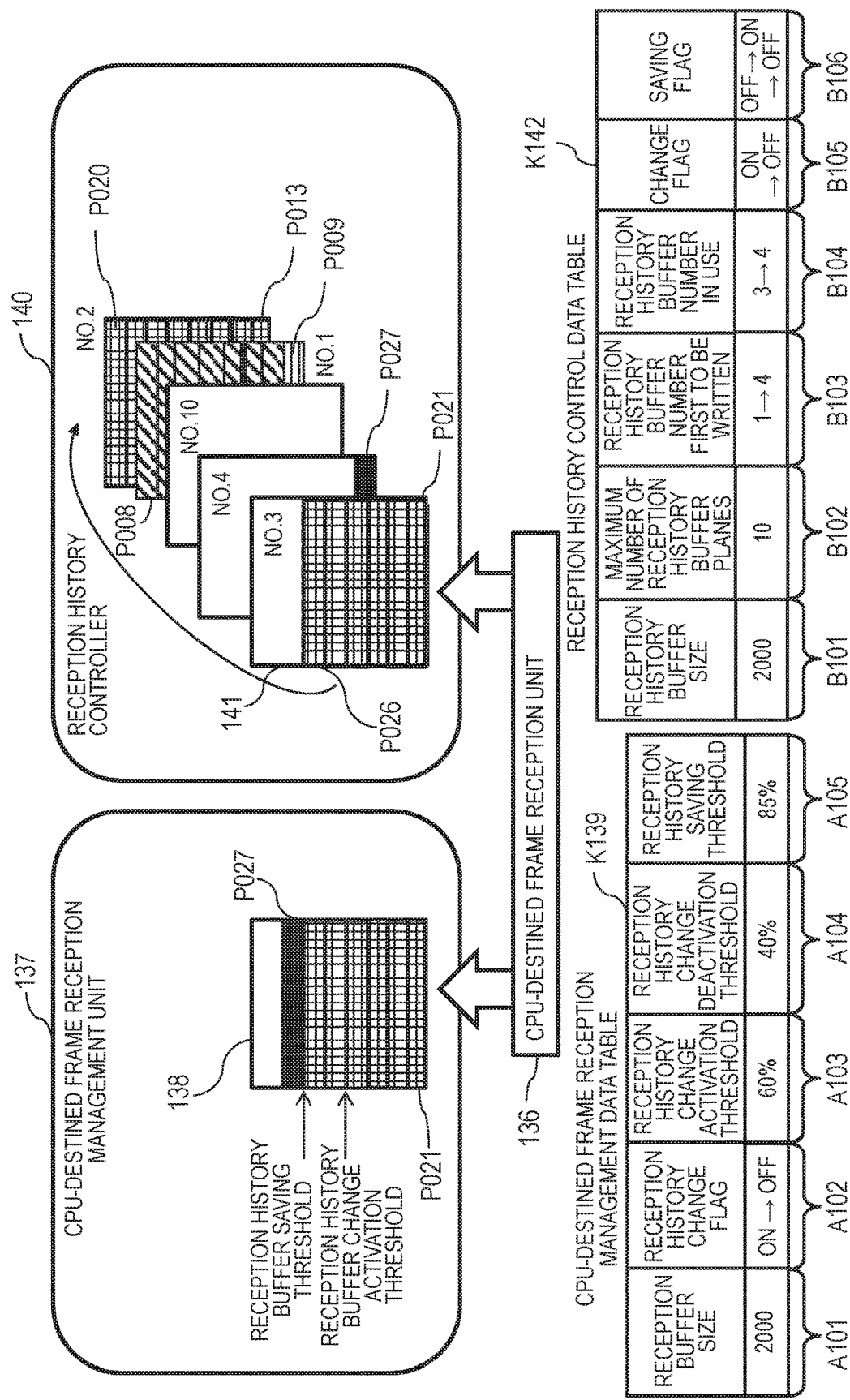
FIG. 11 is a diagram for illustrating packets stored in the reception buffer and packets stored in the reception history buffer in time series.

FIG. 11 illustrates the operation of the CPU-destined frame reception management unit 137 and the reception history controller 140 in the case where the usage of the reception buffer 138 in the CPU-destined frame reception management unit 137 has exceeded the reception history saving threshold A103 in the CPU-destined frame reception management data table K139. First, the CPU-destined frame reception unit 136 sends a CPU-destined packet P027 to the CPU-destined frame reception management unit 137 and the reception history controller 140. After storing the CPU-destined packet P027 to the reception buffer 138, the CPU-destined frame reception management unit 137 determines whether the reception history change flag A102 is on or off with reference to the CPU-destined frame reception management data table K139 (C101). Since the reception history change flag A102 is on, the CPU-destined frame reception management unit 137 determines whether the usage of the reception buffer 138 including the received packet is lower than the reception history change deactivation threshold A104 (C105).

Since the usage of the reception buffer 138 is not lower than the reception history change deactivation threshold A104, the CPU-destined frame reception management unit 137 determines whether the usage of the reception buffer 138 including the received packet is higher than the reception history saving threshold A105 with reference to the CPU-destined frame reception management data table K139 (C108). Since the usage of the reception buffer 138 is higher than the reception history saving threshold A105, the CPU-destined frame reception management unit 137 notifies the reception history controller 140 of saving the reception history information in the reception history buffer to the reception history analysis unit 143 and sets the reception history change flag A102 in the CPU-destined frame reception management data table K139 to off (C110). Upon receipt of the reception history saving notification from the CPU-destined frame reception management unit 137, the reception history controller 140 sets the saving flag B106 in the reception history control data table K142 to on.

Upon receipt of the CPU-destined packet P027 for the reception history buffer 141, the reception history controller 140 determines whether the saving flag B106 is on or off with reference to the reception history control data table K142 (D101). Since the saving flag B106 is on, the reception history controller 140 saves the packet information stored in the reception history buffers from the reception history buffer number first to be written (the first reception history buffer) to the reception history buffer number in use (the third reception history buffer) to the reception history analysis unit 143 as reception history information with reference to the reception history buffer number first to be written B103 and the reception history buffer number in use B104 in the reception history control data table K142 and clears the reception history buffers that have been saved (D108).

The reception history controller 140 sets the change flag B105 and the saving flag B106 in the reception history control data table K142 to off, updates the reception history buffer number in use B104 to the reception history buffer number in use +1 (by setting the fourth reception history buffer), and stores the packet P027 to the reception history buffer (the fourth reception history buffer) indicated in the new reception history buffer number in use. The reception history analysis unit 143 analyzes the saved reception history information to determine the cause of the incident and information on the background to the incident.

According to the above-described embodiment, even in the case where packets are temporarily accumulated in the reception buffer because of the load to the apparatus but such a condition is transient and stabilized later, the packets stored in the reception buffer are saved to the reception history analysis unit 143 to determine the cause of the temporary accumulation of the packets in the reception buffer. Specifically, when the usage of the reception buffer 138 in the CPU-destined frame reception management unit 137 exceeds the reception history change activation threshold A103 in the CPU-destined frame reception management data table A100, changing the buffer planes of the reception history buffer is started.

Subsequently, when the usage of the reception buffer 138 in the CPU-destined frame reception management unit 137 falls below the reception history change deactivation threshold A104, the saving flag in the reception history control data table B100 is set to on, so that the packets stored in the reception history buffer 141 are saved to the reception history analysis unit 143 in accordance with D101 and D108 in FIG. 6.

Alternatively, when the buffer planes become full because of repetitive writing, the reception history controller 140 saves the packets stored in the reception history buffer 141 to the reception history analysis unit in accordance with D105 and D108 in FIG. 6. The information in the reception history buffer 141 is saved to the reception history analysis unit 143 depending on the usage of the plurality of planes of the reception history buffer 141 for accumulating CPU-destined packets, while reception of CPU-destined packets is continued at the CPU-destined frame reception management unit 137. The saved reception history information is analyzed to obtain the cause of the temporary elevation of the usage of the reception buffer and the information on the background to the incident.

According to the above-described embodiment, in the case where the usage of the reception buffer 138 in the CPU-destined frame reception management unit 137 keeps higher than the reception history change activation threshold A103 in the CPU-destined frame reception management data table A100 but neither exceeds the reception history saving threshold A105 nor falls below the reception history change deactivation threshold A104, the planes of the reception history buffer 141 are used up to the maximum. The packet information stored in the reception history buffers (planes) is saved to the reception history analysis unit 143 and the reception history buffers (planes) subjected to the saving are cleared while the buffering CPU-destined packets to the reception history buffer 141 is continued. Meanwhile, the cause of the long-term high usage of the reception buffer and information on the background to the incident can be obtained by analyzing the saved reception history information.

Independently from the usage of the reception buffer 138 in the CPU-destined frame reception management unit 137, the reception history controller 140 may execute changing planes of the reception history buffer 141 and saving the reception history buffer 141 in response to an external trigger such as a command. For example, a case where the administrator wants to analyze the information on the packets received normally by the apparatus applies. When, in response to a command, the external trigger to save the reception history buffer information is generated, the reception history controller 140 sets the saving flag B106 in the reception history control data table B100 to on.

Subsequently, before storing the next packet to the reception history buffer, the reception history controller 140 refers to the reception history control data table B100, saves all the reception history buffers (planes) of the numbers from the reception history buffer number first to be written B103 to the reception history buffer number in user B104 to the reception history analysis unit 143, and clears the buffers (planes). The reception history controller 140 sets the change flag B105 and the saving flag B106 in the reception history control data table B100 to off, increments the reception history buffer number in use B104 by one, and stores the new packet to the reception history buffer indicated in the updated reception history buffer number in use B104. The reception history analysis unit 143 can obtain information on the packets received by the apparatus by analyzing the saved reception history information.

To analyze more incoming packet information, an external trigger such as a command to activate plane change of the reception history buffer 141 is effective. The reception history controller 140 sets the change flag B105 in the reception history control data table B100 to on. The reception history controller 140 collects incoming packets while changing the reception history buffer planes until all the available buffer planes are used up or the saving flag B106 in the reception history control data table B100 is set to on in response to an external trigger to save the information in the reception history buffer. The reception history analysis unit 143 can analyze the information on packets transmitted and received by the packet communication apparatus 101 at any time by analyzing the saved reception history information.

According to the above-described embodiment, if the monitoring result of the usage of the reception buffer indicates that the usage of the reception buffer is low and stable, the reception history buffer 141 uses a single plane as a ring buffer to prevent excessive packet information from being held.

According to the above-described embodiment, in using a plurality of reception history buffers (planes), the number of planes of the reception history buffer 141 to be used for a single packet analysis is limited to the maximum value minus one; hence, the information stored in the reception buffer when the reception history buffer information is being saved can be also monitored and analyzed without exception.

According to the above-described embodiment, when the usage of the reception buffer 138 exceeds a threshold, when the usage of the reception buffer 138 falls below a threshold, and when the reception history buffer planes are depleted are employed as triggers to save the information in the reception history buffer 141. These triggers enable packet analysis under various conditions.

According to the above-described embodiment, the analysis of the saved reception history buffer information can provide factors of in-apparatus congestion such as packet distribution in the reception history buffer 141, input or output ports of the packets, values of the fields of the packets, and times of changes of reception history buffer planes.

According to the above-described embodiment, the packet communication apparatus 101 is provided with a mechanism to collect and analyze the reception history information inside of the packet communication apparatus 101, so that the bandwidth required for communication with the external apparatuses can be used effectively and further, analysis at occurrence of an incident can be performed in real time.

Although the above-described embodiment has been described by focusing on the CPU-destined/-originated packets in the apparatus, this invention is not limited to those packets.

An aspect of this invention provides a traffic analysis apparatus incorporated in a packet communication apparatus connectable to a network. The traffic analysis apparatus includes: a CPU-destined packet reception management unit configured to store packets to a reception buffer and manage the condition of the buffer based on preset information or a CPU-originated packet transmission management unit configured to store packets to a transmission buffer and manage the condition of the buffer based on preset information in receiving CPU-destined packets and sending CPU-originated packets that have potential to become a major cause of in-apparatus congestion; a reception history controller configured to copy all packets stored in the reception buffer, store the copies to a reception history buffer provided correspondingly to the reception buffer, and control changing planes of the reception history buffer and saving packet information stored in the reception history buffer based on a notification from the CPU-destined packet reception management unit or a transmission history controller configured to copy all packets stored in the transmission buffer, store the copies to a transmission history buffer provided correspondingly to the transmission buffer, and control changing planes of the transmission history buffer and saving packet information stored in the transmission history buffer based on a notification from the CPU-originated packet transmission management unit; and a reception history analysis unit configured to analyze reception history information saved by the reception history controller or a transmission history analysis unit configured to analyze transmission history information saved by the transmission history controller.

According to the foregoing aspect, the traffic analysis apparatus incorporated in a packet communication apparatus connectable to a network is configured to additionally store information on the incoming packets for the CPU to the reception history buffer in real time while changing planes of the reception history buffer based on the usage of the reception buffer and preset monitoring threshold information. This configuration enables the traffic analysis apparatus to analyze not only the condition of the reception buffer as of the moment when the reception buffer is overflown but also the conditions of the reception buffer in stages by using the information in the reception history buffer after packets start accumulating in the reception buffer until the reception buffer is overflown.

Likewise, the traffic analysis apparatus is configured to additionally store information on the outgoing packets from the CPU to the transmission history buffer in real time while changing planes of the transmission history buffer based on the usage of the transmission buffer and preset monitoring threshold information. This configuration enables the traffic analysis apparatus to analyze not only the condition of the transmission buffer as of the moment when the transmission buffer is overflown but also the conditions of the transmission buffer in stages by using the information in the transmission history buffer after packets start accumulating in the transmission buffer until the transmission buffer is overflown.

In the foregoing configuration, the reception history buffer or the transmission history buffer stores packets to the planes except for one plane from the maximum number of planes, so that the remaining one plane can store packets received or transmitted when the saving to the reception history analysis unit or the transmission history analysis unit is being processed.

The reception history buffer or the transmission history buffer may be configured to store packet information only to the first plane to write packets when the usage of the reception buffer or the transmission buffer is lower than the threshold and stable, and change the planes only when the usage of the buffer exceeds the monitoring threshold information.

The reception history controller or the transmission history controller can save the information in the reception history buffer or the transmission history buffer to the reception history analysis unit or the transmission history analysis unit not only when the usage of the reception buffer or the transmission buffer being monitored exceeds the specified monitoring threshold but also when the usage is lower than the specified monitoring threshold. This configuration enables analysis of the cause of temporary high load to the reception buffer or the transmission buffer even though in-apparatus congestion does not occur.

The changing the planes of the reception history buffer by the reception history controller or the changing the planes of the transmission history buffer by the transmission history controller and the saving the reception history buffer information to the reception history analysis unit or the saving the transmission history buffer information to the transmission history analysis unit may be carried out not only based on the condition of the reception buffer or the transmission buffer but also in response to an external factor such as a command execution. Such configuration allows analysis of packet information received or transmitted by the packet communication apparatus in response to any event.

Furthermore, the above-described packet communication apparatus allows analysis of packets stored since the usage of the reception buffer starts rising.

What is claimed is:

1. A packet communication apparatus configured to relay packets transmitted and received between information processing apparatuses, the packet communication apparatus comprising:
   a physical line controller connectable to a network;
   a CPU to be a destination of at least one of a plurality of packets to be received through the network interface; and
   a frame controller that includes a CPU-destined frame reception buffer, and a reception history buffer, and the frame controller is configured to:
   hold the packets destined to the CPU in the CPU-destined frame reception buffer in order to output the packets to the CPU,
   hold copies of the packets destined to the CPU held in the CPU-destined frame reception buffer in a first plane of the reception history buffer,
   monitor the usage of the CPU-destined frame reception buffer, change from the first plane to a second plane of the reception history buffer to store newly received copies of the packets destined to the CPU held in the CPU-destined frame reception buffer when the usage reaches a first threshold, and save the copies of the packets held in the reception history buffer to another storage area different than the CPU-destined frame reception buffer and the reception history buffer when the usage reaches a second threshold higher than the first threshold.

2. The packet communication apparatus according to claim 1, wherein each the first plane and the second plane of the reception history buffer has a same capacity as the CPU-destined frame reception buffer.

3. The packet communication apparatus according to claim 1, wherein the frame controller is further configured to:

overwrite the copy of one packet already held in the first plane of the reception history buffer with a copy of another packet destined to the CPU by using the first plane of the reception history buffer as a ring buffer in a case where the usage of the first buffer does not reach the first threshold, and change to the second plane and store the newly received copies of the packets to the second plane in a case where the first plane does not have enough free space when the usage of the first buffer has reached the first threshold.

4. The packet communication apparatus according to claim 3, wherein the frame controller is further configured to overwrite the copy of one packet already held in the first plane with a copy of another packet destined to the CPU by using the first plane as the ring buffer in a case where the first plane does not have enough free space when the usage of the first buffer falls below a third threshold after reaching the first threshold.

5. The packet communication apparatus according to claim 1, wherein the frame controller further includes a CPU-originated frame transmission buffer and a transmission history buffer having a plurality of planes, and wherein the frame controller is further configured to hold packets originated from the CPU in the CPU-originated frame transmission buffer in order to output the packets from the CPU to a network via the network interface, hold copies of the packets originated from the CPU held in the third buffer in the plurality of planes of the transmission history buffer based on usage of the CPU-originated frame transmission buffer.

6. A packet communication apparatus configured to relay packets transmitted and received between information processing apparatuses, the packet communication apparatus comprising:

a physical line controller connectable to a network;

a CPU to be either a destination of at least one of a plurality of packets to be received through the network interface or a source of at least one of a plurality of packets to be sent out through the network interface; and a frame controller that includes a frame reception buffer, and a reception history buffer, a frame transmission buffer, and a transmission history buffer, and the frame controller is configured to:

hold received incoming packets in the reception buffer in order to output the held incoming packets to the CPU, hold outgoing packets output from the CPU in the transmission buffer in order to send the held outgoing packets out to the network, hold copies of the outgoing packets in an area determined based on a status of the held outgoing packets of the transmission buffer, hold copies of the packets destined to the CPU held in the frame reception buffer in a first plane of the reception history buffer, monitor the usage of the frame reception buffer, change from the first plane to a second plane of the reception history buffer to store newly received copies of the packets destined to the CPU held in the frame reception buffer when the usage reaches a first threshold, and save the copies of the packets held in the reception history buffer to another storage area different than the frame reception buffer, the reception history buffer, the frame transmission buffer, and the transmission history buffer when the usage reaches a second threshold higher than the first threshold.

* * * * *